US010587953B2

(12) United States Patent
Suyama et al.

(10) Patent No.: US 10,587,953 B2
(45) Date of Patent: Mar. 10, 2020

(54) COMMUNICATION SYSTEM, COMMUNICATION DEVICE, AND COMMUNICATION DEVICE MANAGEMENT METHOD

(71) Applicant: YAMAHA CORPORATION, Hamamatsu-shi (JP)

(72) Inventors: Akihiko Suyama, Hamamatsu (JP); Masakazu Shirai, Toyohashi (JP); Yuki Suemitsu, Hamamatsu (JP); Tomoyoshi Akutagawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/805,541

(22) Filed: Nov. 7, 2017

(65) Prior Publication Data
US 2018/0077494 A1 Mar. 15, 2018

Related U.S. Application Data

(63) Continuation of application No. PCT/JP2016/074194, filed on Aug. 19, 2016.

(30) Foreign Application Priority Data

Aug. 19, 2015 (JP) ................. 2015-162329

(51) Int. Cl.
*H04B 7/00* (2006.01)
*H04R 3/12* (2006.01)
(Continued)

(52) U.S. Cl.
CPC ........... *H04R 3/12* (2013.01); *H04L 41/0803* (2013.01); *H04W 8/005* (2013.01); *H04W 8/22* (2013.01);
(Continued)

(58) Field of Classification Search
CPC ...... H04R 3/12; H04R 84/18; H04R 2227/03; H04R 2227/005; H04W 76/10; H04W 8/22; H04W 8/005; H04W 84/12; H04W 84/18
See application file for complete search history.

(56) References Cited

U.S. PATENT DOCUMENTS 8,379,537 B2 * 2/2013 Matsuda ............. H04L 41/0253
370/254
9,154,185 B2  10/2015 Warren
(Continued)

FOREIGN PATENT DOCUMENTS

JP    2001359200 A    12/2001
JP    2003101546 A     4/2003
(Continued)

OTHER PUBLICATIONS

International Search Report issued in Intl. Appln. No. PCT/JP2016/074194 dated Nov. 15, 2016. English translation provided.
(Continued)

*Primary Examiner* — Tuan Pham
(74) *Attorney, Agent, or Firm* — Rossi, Kimms & McDowell LLP

(57) ABSTRACT

A communication system includes a control terminal device and one or more communication devices. The control terminal device transmits a search message to entire network when the communication device is registered into the communication system. When the communication device is connected to the network, the communication device determines whether a connection position of the connected communication device on the network is the predetermined connection position. When the communication device is not positioned at the predetermined connection position, the communication device cancels the connection with the network and then connects to the predetermined connection (Continued)

position of the network and responds to the search message through the network after the communication device directly connects to the control terminal device and obtains information for connecting to the predetermined connection position of the network.

18 Claims, 11 Drawing Sheets

(51) Int. Cl.
    *H04L 12/24* (2006.01)
    *H04W 8/00* (2009.01)
    *H04W 76/10* (2018.01)
    *H04W 8/22* (2009.01)
    *H04W 84/12* (2009.01)
    *H04W 84/18* (2009.01)

(52) U.S. Cl.
    CPC ....... *H04W 76/10* (2018.02); *H04R 2227/003* (2013.01); *H04R 2227/005* (2013.01); *H04R 2420/07* (2013.01); *H04W 84/12* (2013.01); *H04W 84/18* (2013.01)

(56) References Cited

U.S. PATENT DOCUMENTS

| | | |
|---|---|---|
| 2006/0034235 A1 | 2/2006 | Yamane |
| 2010/0115262 A1 | 5/2010 | Suyama et al. |
| 2012/0315921 A1* | 12/2012 | Stone .................. H04W 4/02 455/456.1 |
| 2013/0173794 A1 | 7/2013 | Agerbak et al. |
| 2015/0350017 A1 | 12/2015 | King |
| 2017/0048805 A1* | 2/2017 | Davey ............. H04W 52/241 |

FOREIGN PATENT DOCUMENTS

| | | |
|---|---|---|
| JP | 2006081164 A | 3/2006 |
| JP | 2008148031 A | 6/2008 |
| JP | 2014138204 A | 7/2014 |

OTHER PUBLICATIONS

Written Opinion issued in Intl. Appln. No. PCT/JP2016/074194 dated Nov. 15, 2016.

Extended European Search Report issued in European Appln. No. 16837170.6 dated Nov. 30, 2018.

English translation of Written Opinion issued in Intl. Appln. No. PCT/JP2016/074194 dated Nov. 15, 2016, previously cited in IDS filed Nov. 7, 2017.

Office Action issued in Japanese Appln. No. 2015-162329 dated Sep. 3, 2019. English translation provided.

Office Action issued in U.S. Appl. No. 16/575,877 dated Oct. 18, 2019.

* cited by examiner

FIG. 4

SYSTEM MANAGEMENT TABLE (DEVICE LIST, AP LIST)

| | DEVICE ID | MAC ADDRESS | IP ADDRESS | HOP COUNT | AP ACTIVATION | NUMBER OF CHILDREN | ACTIVE |
|---|---|---|---|---|---|---|---|
| SYSTEM ID = 01 | 00 | xx-xx-xx-xx-xx-xx yy-yy-yy-yy-yy-yy | 192.168.0.1 192.168.1.1 | 0 (ROOT) | ACTIVATED | 2 | 1 |
| | 01 | xx-xx-xx-xx-xx-xx yy-yy-yy-yy-yy-yy | 192.168.0.2 192.168.1.2 | 1 (NODE) | ACTIVATED | 1 | 1 |
| | 02 | xx-xx-xx-xx-xx-xx yy-yy-yy-yy-yy-yy | 192.168.0.3 192.168.1.3 | 2 (LEAF) | NOT ACTIVATED | 0 | 1 |
| | 03 | xx-xx-xx-xx-xx-xx yy-yy-yy-yy-yy-yy | 192.168.0.4 192.168.1.4 | 99 (BRANCH) | NOT ACTIVATED | 0 | 1 |

| EXTERNAL ACCESS POINT INFORMATION | SSID | PASS PHRASE | SECURITY TYPE | BSSID |
|---|---|---|---|---|

FIG. 5

AUDIO CONTROL TABLE

| | DEVICE ID | IP ADDRESS | MODEL | INSTALLATION PLACE | VARIOUS SETTING INFORMATION | ACTIVE |
|---|---|---|---|---|---|---|
| SYSTEM ID = 01 | 00 | 192.168.0.1 | AV RECEIVER | LIVING | ------ | 1 |
| | 01 | 192.168.0.2 | PLAYER | LIVING | ------ | 1 |
| | 02 | 192.168.0.3 | SPEAKER | DINING | ------ | 1 |
| | 03 | 192.168.0.4 | SPEAKER | BED ROOM | ------ | 1 |

COMMUNICATION SYSTEM, COMMUNICATION DEVICE, AND COMMUNICATION DEVICE MANAGEMENT METHOD

CROSS REFERENCE TO RELATED APPLICATIONS

This application is a continuation of PCT application No. PCT/JP2016/074194, which was filed on Aug. 19, 2016 based on Japanese Patent Application (No. 2015-162329) filed on Aug. 19, 2015, the contents of which are incorporated herein by reference.

BACKGROUND OF THE INVENTION

1. Field of the Invention

This disclosure relates to an audio system (communication system) where a plurality of audio devices (communication devices) are connected by a network.

2. Description of the Related Art

In audio systems formed of a plurality of audio devices, conventionally, audio devices are connected together by an analog or a digital audio cable. In recent years, to eliminate complicated cables and increase the degree of freedom of the connection configuration, it has been considered to connect the devices by a network (particularly, a wireless network) and transmit and receive audio signals and command messages in packets.

Although audio cables are necessary for all the inputs and outputs, connection is completed by physically connecting them to the terminals of the devices. On the contrary, wireless networks require setting of SSIDs and passwords, for example, as shown in JP-A-2003-101546, and the setting work is more complicated than the cable connection. Moreover, when it is necessary to change the destination of connection of a device to another destination of connection and perform reconnection, this reconnection processing is complicated similarly to the initial setting.

SUMMARY OF THE INVENTION

Accordingly, an object of the present disclosure is to automate, in a communication system where a plurality of communication devices are connected by using a network, the procedure of connecting the communication devices to predetermined connection positions of the network.

A communication system of the present disclosure is a communication system including:

a control terminal device configured to be connected by a network; and one or more communication devices, wherein the one or more communication devices is connected to a predetermined connection position of the network;

wherein the control terminal device includes:

a communication portion configured to communicate with the one or more communication devices through the network or by direct connection; and a storage portion configured to store a system management table for managing the one or more communication devices of the communication system;

wherein the control terminal device is configured to transmit a search message to the entire network when the communication device is registered into the communication system;

wherein the communication device includes a communication portion configured to communicate with the one or more control terminal devices through the network or by direct connection;

wherein when the communication device is connected to the network, the communication device is configured to determine whether a connection position of the connected communication device on the network is the predetermined connection position;

wherein when the communication device is connected to the predetermined connection position, the communication device is configured to respond to the search message through the network; and wherein when the communication device is connected to the network but is not connected to the predetermined connection position, the communication device is configured to cancel the connection with the network, and after directly connecting to the control terminal device and obtaining information for connecting to the predetermined connection position of the network, the communication device is configured to connect to the predetermined connection position of the network and to respond to the search message through the network.

A communication system of the present disclosure is a communication system including:

a plurality of unit communication systems each having a control terminal device and one or more communication devices which are connected by a network, wherein the control terminal device includes a communication portion configured to communicate with the one or more communication devices through the network or by direct connection;

wherein the control terminal device is configured to transmit a network connection preparation command to the communication device in the unit communication system to which the control terminal device belongs when a communication device is added to the unit communication system to which the control terminal device belongs;

wherein the communication device includes:

a communication portion configured to communicate with the control terminal device through the network or by direct connection; and an operation portion configured to accept an operation of connection to the communication system; and wherein when the operation portion accepts the operation of connection, the communication device is configured to directly connect to the control terminal device that transmits the network connection preparation command and to obtain information for connecting to the network of the unit communication system in a case that the communication portion of the communication device is not connected to the network or in a case that the network connection preparation command is not received although the communication portion of the communication device is connected to the network.

A communication device management method of the present disclosure is a communication device management method of a communication system including a control terminal device configured to be connected by a network and one or more communication devices and wherein the one or more communication devices is connected to a predetermined connection position of the network, wherein the control terminal device transmits a search message to the entire network;

wherein the communication device determines whether the communication device itself is connected to the network;

wherein when the communication device is connected to the network, the communication device determines whether a network connection position of the communication device is the predetermined connection position;

wherein when the communication device is connected to the predetermined connection position, the communication device responds to the search message through the network;

wherein when the communication device is not connected to the predetermined connection position, the communication device cancels the network connection, directly connects to the control terminal device without through the network, and obtains information for connecting to the predetermined connection portion of the network;

wherein the communication device having obtained the information for connecting to the predetermined connection position of the network connects to the predetermined connection position of the network, and responds to the search message through the network; and wherein the control terminal device receives the response to the search message, and registers the communication device into the communication system.

A communication device of the present disclosure is a communication device including:

a communication portion configured to communicate with a control terminal device for managing the control terminal device through a network or by direct connection; and a control portion, wherein when the communication portion is connected to the network, the control portion is configured to determine whether the connection position of the communication device on the network is the predetermined connection position;

wherein when the communication device is connected to the predetermined connection position, the communication portion is configured to respond to a search message through the network; and wherein when the communication device is not connected to the predetermined connection position although the communication portion is connected to the network, the communication portion is configured to cancel the connection with the network, to obtain information for connecting to the predetermined connection position of the network by directly connecting to the control terminal device, and then to respond to the search message through the network by connecting the predetermined connection position of the network.

According to this disclosure, when a communication device registered in a first communication system is shifted to a second communication system, the registration of the communication system can be shifted after the tree-form connection of the network is changed.

BRIEF DESCRIPTION OF THE DRAWINGS

FIG. 4 is a view showing an example of a system management table that is set in the host device and the controller.

FIG. 5 is a view showing an example of an audio control table that is set in the controller.

DETAILED DESCRIPTION OF THE EXEMPLARY EMBODIMENTS

Figure 1:
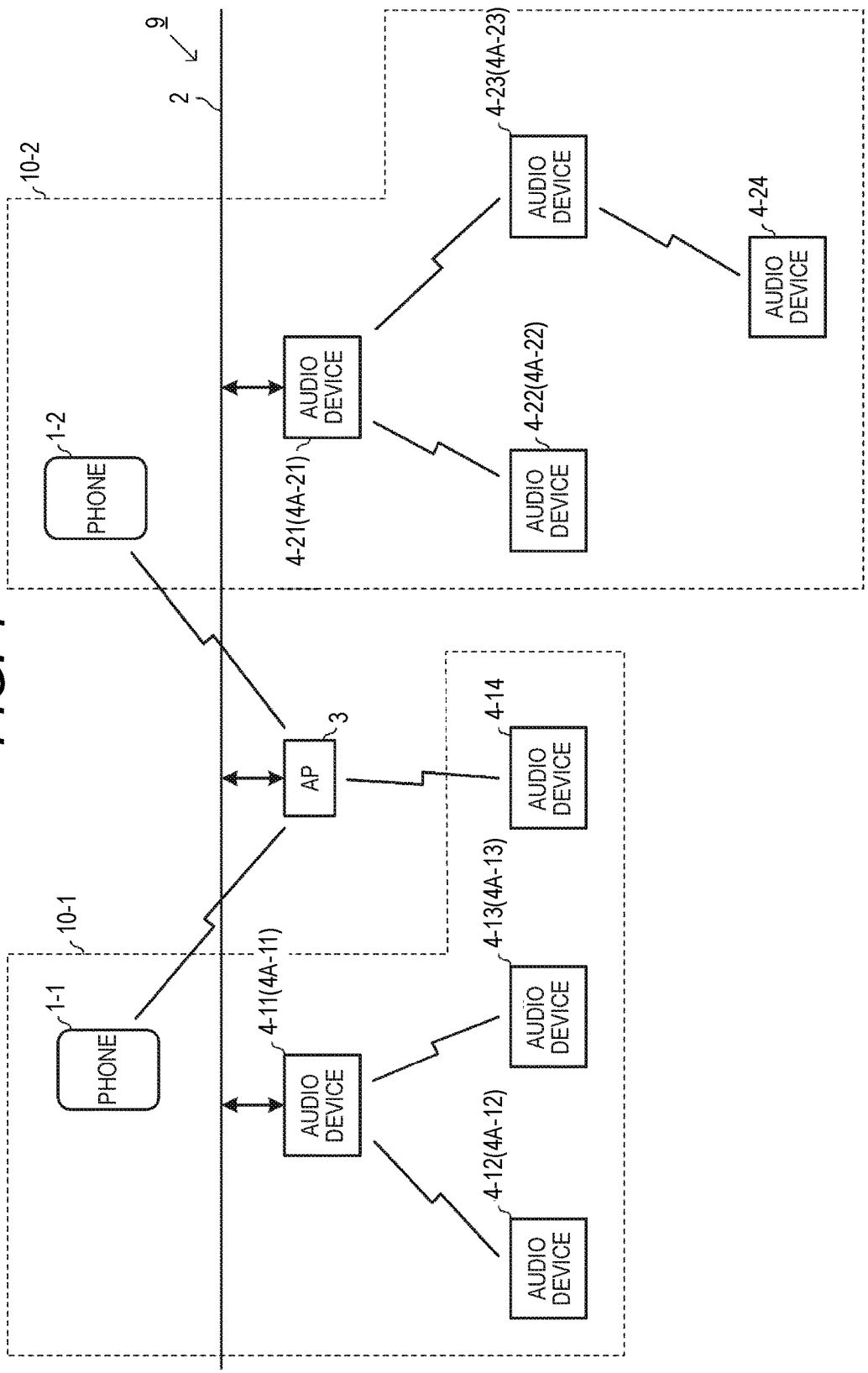
FIG. 1 is a configuration diagram of an audio system to which this disclosure is applied.

FIG. 1 is a view showing the configuration of an audio system to which the present disclosure is applied. This figure shows two audio systems 10-1 and 10-2. The audio systems 10 each have a plurality of audio devices 4 connected by a network 9 including a wired LAN 2 and an access point (external access point) 3, and a multifunctional mobile phone 1 (hereinafter, referred to as mobile phone 1) that functions as a controller 1. The audio devices 4 transmit and receive audio signals with each other through the network 9. The controller 1 transmits command messages to the audio devices 4 through the network 9.

The audio systems 10-1 and 10-2 are each identified by a unique system ID (hereinafter, sometimes abbreviated as LID). While the system ID may be an arbitrary character string, in this embodiment, the system IDs of the audio systems 10-1 and 10-2 are 01 and 02, respectively. The system ID corresponds to the system identification information of the present disclosure.

The audio devices 4 (hereinafter, also referred to as component devices) constituting the audio systems 10 each have a wired LAN function and two wireless LAN functions. The audio devices 4 are capable of activating an access point by using one of the two wireless LAN functions. The access point activated by the audio devices 4 is called an internal access point 4A. To the internal access point 4A, a lower level audio device 4 is connected. The internal access point 4A normally (other than at the time of initial connection described later) operates in a stealth mode so that its existence is hardly known to other devices. The other wireless LAN function functions as a child device of the wireless LAN, and is connected to the internal access point 4A of the higher level audio device 4 or an external access point 3.

The audio system 10-1 has a plurality of audio devices 4 (4-11 to 4-14) interconnected by the wired LAN 2 and the wireless LAN and the multifunctional mobile phone 1-1 that functions as the controller 1-1. The audio system 10-2 has a plurality of audio devices 4 (4-21 to 4-24) interconnected by the wired LAN 2 and the wireless LAN and the multifunctional mobile phone 1-2 that functions as the controller 1-2. These audio systems 10-1 and 10-2 share the wired LAN 2, and coexist in the same segment.

To the wired LAN 2, the access point (external access point) 3 is connected. The audio devices 4-11 and 4-21 are connected to the wired LAN 2. The audio devices 4-12, 4-13, 4-22 and 4-23 are connected to the internal access point 4A-11 and 4A-21 of the higher level audio devices 4-11 and 4-21 by the wireless LAN. The audio device 4-14 is connected to the external access point 3. Moreover, the controllers 1-1 and 1-2 communicate with the audio devices 4 through the external access point 37.

In this embodiment, the network 9 is formed of the wired LAN 2 and the wireless LAN including the external access point 3 and the internal access points 4A. As the wired LAN 2, for example, Ethernet (trademark: IEEE 802.3) is used, and as the wireless LAN, for example, Wi-Fi (IEEE 802.11g) is used.

The audio devices 4 are called a root device, a node device, a leaf device and a branch device according to the configuration of connection to the wired LAN 2. The root device is the highest level device connected to the wired LAN 2 directly (by cable), and in FIG. 1, the audio devices 4-11 and 4-21 are root devices. The root devices are audio devices registered first at the time of construction of the audio systems 10-1 and 10-2, and serve as the base points of the audio systems 10-1 and 10-2, respectively. The root device connects the lower level audio device 4 to the network and activates the internal access point 4A for participation in the audio systems 10.

The node device is a middle level device connected to the root device (the internal access point 4A of the root device) by the wireless LAN, and in FIG. 1, the audio devices 4-12, 4-13, 4-22 and 4-23 are node devices. The node device connects the lower level audio device 4 to the network and activates the internal access point 4A for participation in the audio system 10.

The leaf device is a lower level device connected to the node device (the internal access point 4A of the node device) by the wireless LAN, and in FIG. 1, the audio device 4-24 is a leaf device. While the leaf device does not activate the internal access point 4A, it may be structured so as to activate it.

The branch device is an audio device 4 connected to the external access points 3 and 7 by the wireless LAN separately from the above-described trees and communicates with other audio devices 4 in the audio systems 10 through the wired LANs 2 and 6, and in FIG. 1, the audio device 4-14 is a branch device. In each audio system 10, there is no limit to the number of branch devices. While the branch device does not activate the internal access point 4A, it may be structure so as to activate it.

In this audio system, for transmission of high-quality audio signals, up to two node devices are allowed to be connected to a root device. To each node device, up to two leaf devices are allowed to be connected. The number of levels of the hierarchy of connection using the internal access point 4A is up to three of the root device, the node device and the leaf device. Therefore, by the tree of the wireless LAN with a root device at the top, up to seven audio devices including the root device can be connected. However, in the present disclosure, the number of levels of the hierarchy of a tree and the number of lower level devices that can be connected to each audio device 4 are not limited to those of this embodiment.

The mobile phone 1 functions as the audio system controller (hereinafter, referred to as controller) 1 by an audio system control program 70 (see FIG. 2) being activated. The mobile phone 1 (the controller 1) communicates with the audio devices 4 belonging to the audio system 10 through the network 9. By this communication, the controller 1 controls the audio source reproduced in the audio system 10 (for example, to which audio device 4 a piece of music of which audio device 4 is delivered) and the volume thereof. Moreover, the audio devices 4 communicate with the audio devices 4 to which they belong through the network 9, and transmit and receive audio signals with each other.

Figure 2:
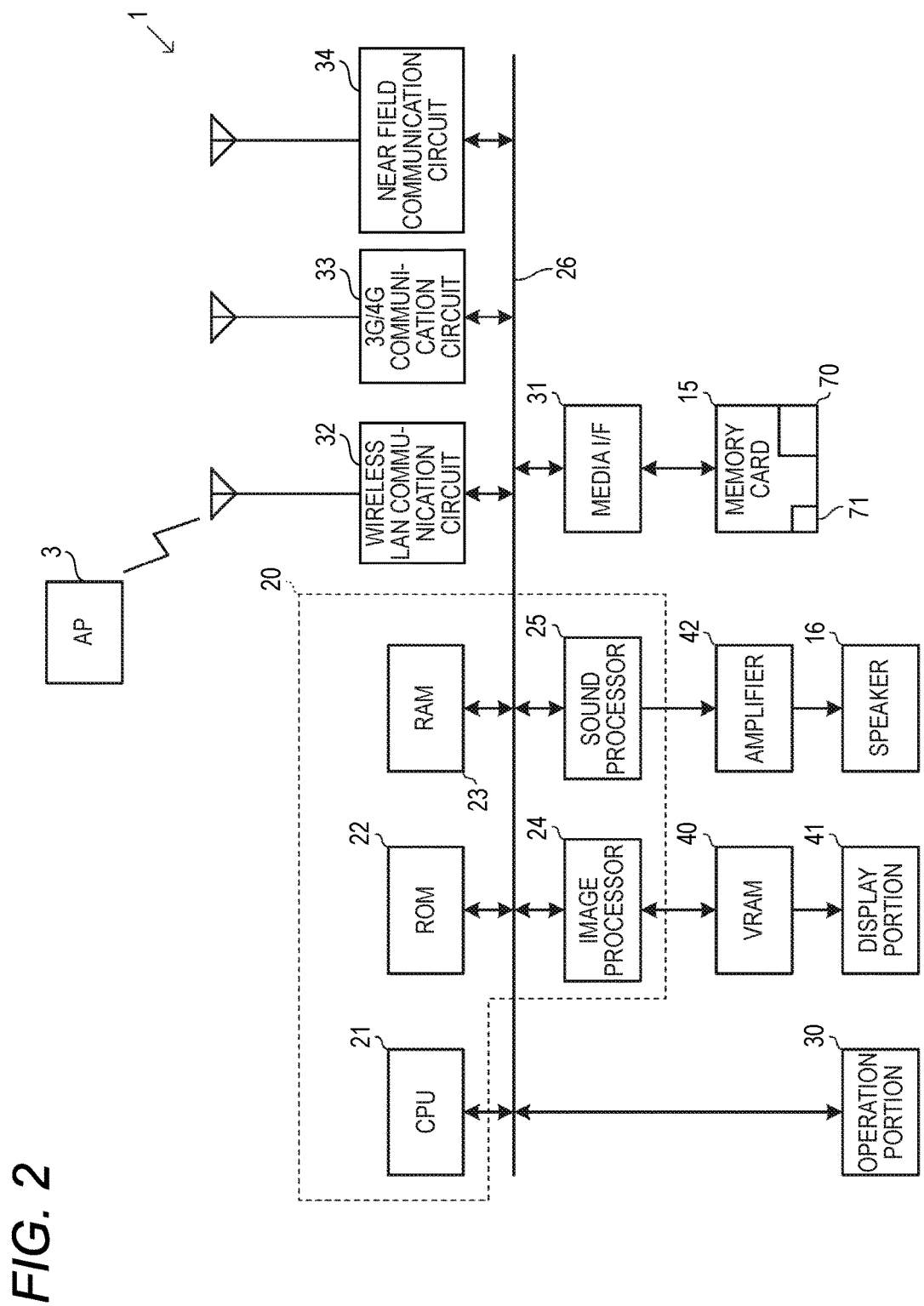
FIG. 2 is a block diagram of a mobile phone to which this disclosure is applied and that functions as a controller.

Next, referring to the block diagram of FIG. 2, the structure of the mobile phone 1 will be described. The mobile phone 1 is a multifunctional telephone which is a so-called smartphone. The mobile phone 1 has a 3G/4G communication function which is a mobile communication network, a wireless LAN (Wi-Fi) communication function and a Bluetooth (trademark) communication function. The mobile phone 1 functions as the controller 1 by activating the audio system control program 70 which is an application program, communicates with the audio devices 4 of the audio system through the external access point 3, and transmits a command message responsive to an operation by the user to the audio devices 4 to control the audio system.

The mobile phone 1 has, on a bus 26, a control portion 20, an operation portion 30, a media interface 31, a wireless LAN communication circuit 32, a 3G/4G communication circuit 33 and a near field communication circuit 34 capable of performing Bluetooth (trademark) communication. The control portion 20 includes a CPU 21, a ROM (flash memory) 22, a RAM 23, an image processor 24 and a sound processor 25. To the image processor 24, a video RAM (VRAM) 40 is connected, and to the VRAM 40, a display portion 41 is connected. The display portion 41 includes a liquid crystal display. On the display, a standby screen, a telephone number and the like are displayed. Moreover, when the mobile phone 1 functions as the controller 1, a screen for controlling the audio devices 4 is displayed. To the sound processor 25, an amplifier 42 including a D/A converter is connected, and to the amplifier 42, a speaker 16 is connected.

The image processor 24 is provided with a GPU (graphics processing unit) that generates various images such as a standby screen, telephone numbers and the like. When the audio system control program 70 is activated, the image processor 24 generates an image of an audio controller according to the instruction of the CPU, and develops this on the VRAM 40. The image developed on the VRAM 40 is displayed on the display portion 41.

The sound processor 25 has a DSP (digital signal processor) that encodes/decodes call voices. The sound processor 25 outputs the decoded/generated voice to the amplifier 42. The amplifier 42 amplifies this voice signal and outputs it to the speaker 16.

The wireless LAN communication circuit 32 performs wireless communication with a router according to a standard such as IEEE 802.11g, and communicates with the audio devices 4 through the external access points 3 and 7. The 3G/4G communication circuit 33 performs voice calls and data communications through a mobile telephone communication network. The near field communication circuit 34 performs communication with other Bluetooth (trademark)-compatible devices, and performs, for example, audio signal transmission and reception.

The operation portion 30 includes a touch panel formed on the display portion 41, and detects touch operations and flick operations on the touch panel. When the audio system control program 70 is activated, a plurality of operation elements such as a setup button and a scan button are displayed on the display portion 41. The operation portion 30 detects a touch operation by the user on the touch panel and its coordinates, and determines which operation element has been operated.

To the media interface 31, a memory card 15 is connected. The memory card 15 is, for example, a micro SD card. The audio system control program 70 is stored in the memory card 15 or the ROM 22. In this embodiment, as shown in FIG. 2, the audio system control program 70 is stored in the memory card 15. The audio system control program 70 may be downloaded by 3G/4G or wireless LAN data communication or may be prestored in the ROM 22 or the memory card 15. Moreover, a storage area 71 storing the configuration of the audio system is set in the memory card 15.

The ROM 22 stores a basic program for executing calls and application programs of this mobile phone 1. Moreover, the ROM 22 is a flash memory, and is capable of storing downloaded application programs in addition to the basic program. In the RAM 23, a work area used when the CPU 20 executes the audio system control program 70 is set.

Next, referring to FIG. 3, the structure of the audio device 4 will be described. The audio device 4 has a control portion 50, an audio processing portion 51 and an operation portion 59, and has two wireless LAN communication portions (RF modules) 56 and 57 and a wired LAN communication portion 58. The operation portion 59 has a connect button 59A. The control portion 50 includes a CPU and a memory, and stores an audio system program. The control portion 50 controls the operations of the audio processing portion 51, the wireless LAN communication portions 56 and 57 and the wired LAN communication portion 58 by the audio system program. Moreover, when the connect button 59A is depressed, the control portion 50 executes an initial connection operation which is an operation for connecting this audio device 4 to the network 9. Details of the initial connection operation will be described later.

The wireless LAN communication portion 56 performs wireless communication with the external access point 3 or the internal access point 4A according to a wireless LAN standard such as IEEE 802.11g. Moreover, the other wireless LAN communication portion 57 is activated as an access point (the internal access point 4A), and relays other audio devices (for example, the audio devices 4-2 and 4-3) to the wired LAN 2. Moreover, the wireless LAN communication portion 57 is also activated as a temporary access point for initial connection at the time of initial connection of this audio device 4, and communicates with the controller 1 (the mobile phone 1). The operation at the time of the initial connection will be described later. The two wireless LAN communication portions 56 and 57 may be implemented by one piece of hardware operating in a time-sharing manner. The wired LAN communication portion 58 has a cable connector, and performs communication through the wired LAN 2 and the external access point 3 according to a communication standard such as IEEE 802.3. To the access point 3, the controller (mobile phone) 1 is connected, and the control portion 50 communicates with the controller 1 through the network 9 to transmit the operating status and receive command messages.

The SSID and password of the internal access point 4A are character strings that can be deduced from the MAC address of the wireless LAN communication portion 57. For example, a MAC address which is expressed in octets is made the SSID and the lower three octets (the device ID+the serial number) are made the password. Thereby, the audio device that newly participates in the audio system can detect the internal access point 4A based on the SSID, that is, based on the vendor ID of the MAC address and the device ID, and can generate a password by itself and connect to the internal access point 4A. Thereby, the input of the SSID and the password by the user when connection is made to the internal access point 4A can be omitted. The method of generating the SSID and password of the internal access point 4A is not limited to the above-described one.

The audio processing portion 51 has a tuner 52, an audio circuit 53 and a power amplifier 54. The tuner 52 receives an audio signal from an FM broadcast or the Internet and inputs it to the audio circuit 53. The audio circuit 53 performs processing such as equalization and volume control on the inputted audio signal, and then, outputs this processed audio signal to the power amplifier 54. The power amplifier 54 amplifies the inputted audio signal and outputs it to an externally connected speaker 55. The speaker 55 emits the inputted audio signal as a sound.

Figure 3:
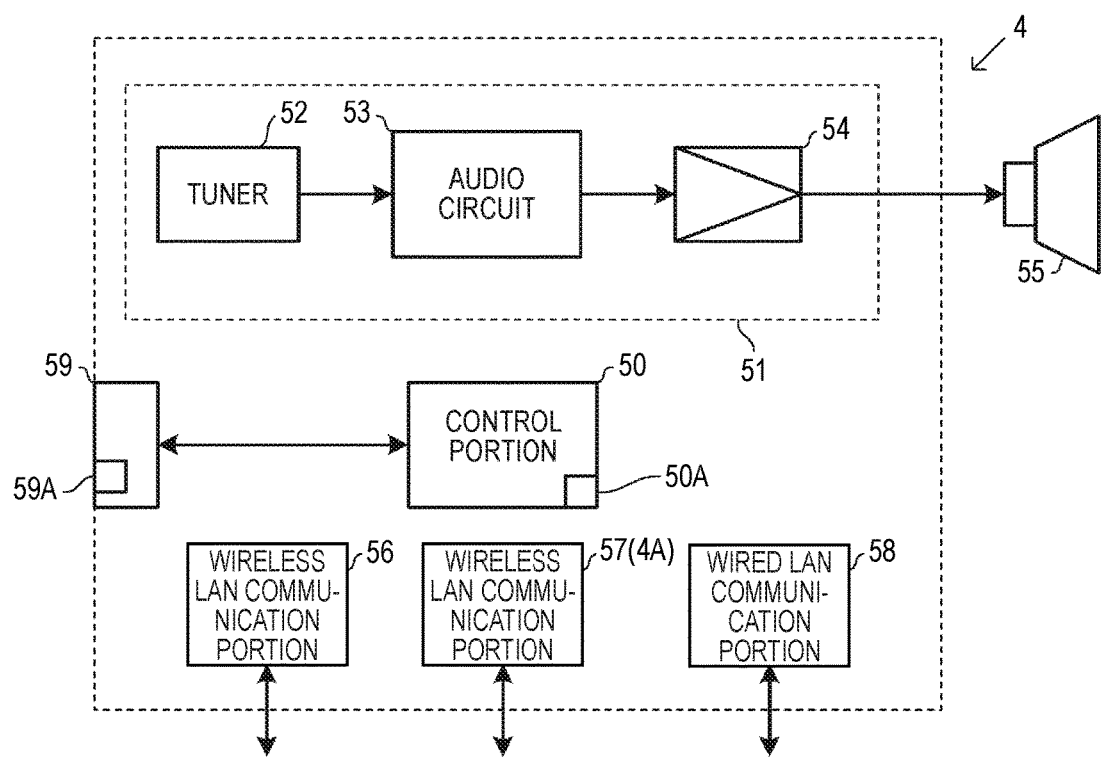
FIG. 3 is a block diagram of an audio device to which this disclosure is applied.

While the audio devices 4-1 to 4-8 may be devices different from one another, the basic structure of the communication function and the audio signal processing function is that shown in FIG. 3.

FIG. 4 and FIG. 5 are views showing examples of tables that manage the audio system. FIG. 4 is a system management table that manages the connection configuration of the audio devices 4 in the network 9. FIG. 5 is an audio control table that manages the operation of the audio devices 4 in the audio system 10. The system management table is used for the management of network connection mainly by the root devices 4-11 and 4-21. The audio control table is used for the control of audio source reproduction mainly by the controllers 1-1 and 1-2. The tables shown in FIG. 4 and FIG. 5 are examples and do not show the structure of any of the audio system 10-1 or 10-2.

The system management table stores the connection configuration of the audio devices 4 (component devices) constituting the audio system 10-$n$ (n=1, 2), and is created by the controller 1 when the audio system 10 is constructed. Moreover, when a new audio device 4 is added to the audio system 10, the controller 1 performs updating to add this audio device 4. The created or added and updated system management table is transmitted from the controller 1 to the root devices 4-$n$1. Thereafter, the system management table is updated by the root device 4-$n$1 every time disconnection or reconnection of any of the component devices occurs while the audio system 10 is operating. Moreover, the root device 4-$n$1 periodically transmits all or some of the contents of the system management table as system information to the component devices and the controller 1. Thereby, the component devices and the controller 1 can always hold the latest system information.

The system management table is identified by the system ID for identifying this audio system 10. The component devices each store, in a state of being associated with the device ID of the device, information such as the higher side (child device side)/lower side (internal access point side) MAC address, the higher side/lower side IP address, the stage of connection from the root device 4-$n$1 (hop count), the presence or absence of activation of the internal access point, the number of lower devices connected to the internal access point 4A (the number of children) and the operating status (communication possible/impossible) information (active). When any of the component devices is disconnected from the root device 4-1 (when communication ceases), the column of the device is made inactive, and when the device is reconnected, updating is performed with the contents of the reconnection to make the column active again.

While the audio devices 4 connected to the network 9 each have an individual IP address, for each of the audio systems 10-1 and 10-2, a multicast address is set as a multicast group. By transmitting an IP packet to the multicast address, all the components of the audio system 10-1 or the audio system 10-2 can be made to receive this packet.

The audio control table of FIG. 5 stores, in a state of being associated with the device ID of each device, the higher side IP address, the device kind, the installation place and the operating status information of each component device and various setting information such as the volume value. The columns of the audio control table and the columns of the system management table are associated by the device IDs, respectively. The controller 1 creates a control screen based on the contents of the audio control table, and accepts the control of each component device by the user.

When the audio system 10-$n$ is constructed, the root device 4-$n1$ is set first to construct the audio system 10-$n$. Thereafter, audio devices 4-$nm$ other than the root device 4-$n1$ are added to this audio system 10-$n$. In this case, the user performs work by the following procedure: The audio device 4-$n1$ serving as the root device is connected to a cable to the wired LAN 2. On the mobile phone 1, the controller 1-$n$ is activated in a setup mode. The connect button 59A of the audio device 4$n$-1 is depressed. When the user performs the above-described work, the controller 1-$n$ and the root device 4-$n1$ communicate with each other, and automatically construct the audio system 10-$n$. Thereafter, when a new audio device 4-$nm$ is added to the audio system 10-$n$, the user activates the controller 1-$n$ in the setup mode, turns on the audio device 4-$nm$ to be added (activates the wireless LAN communication portions 56 and 57) and depresses the connect button 59A; then, the audio device 4-$nm$ communicates with the controller 1-$n$ and the root device 4-$n1$ and is automatically added to the audio system 10-$n$.

Referring to FIG. 6 to FIG. 9, the procedure of the communication between the controller 1 and the audio device 4 when the audio system 10 is constructed and when the audio device 4 is added to the audio system 10 will be described. In this description, the designation "-n, n" indicative of the number (location ID) of the audio system is omitted.

Figure 6:
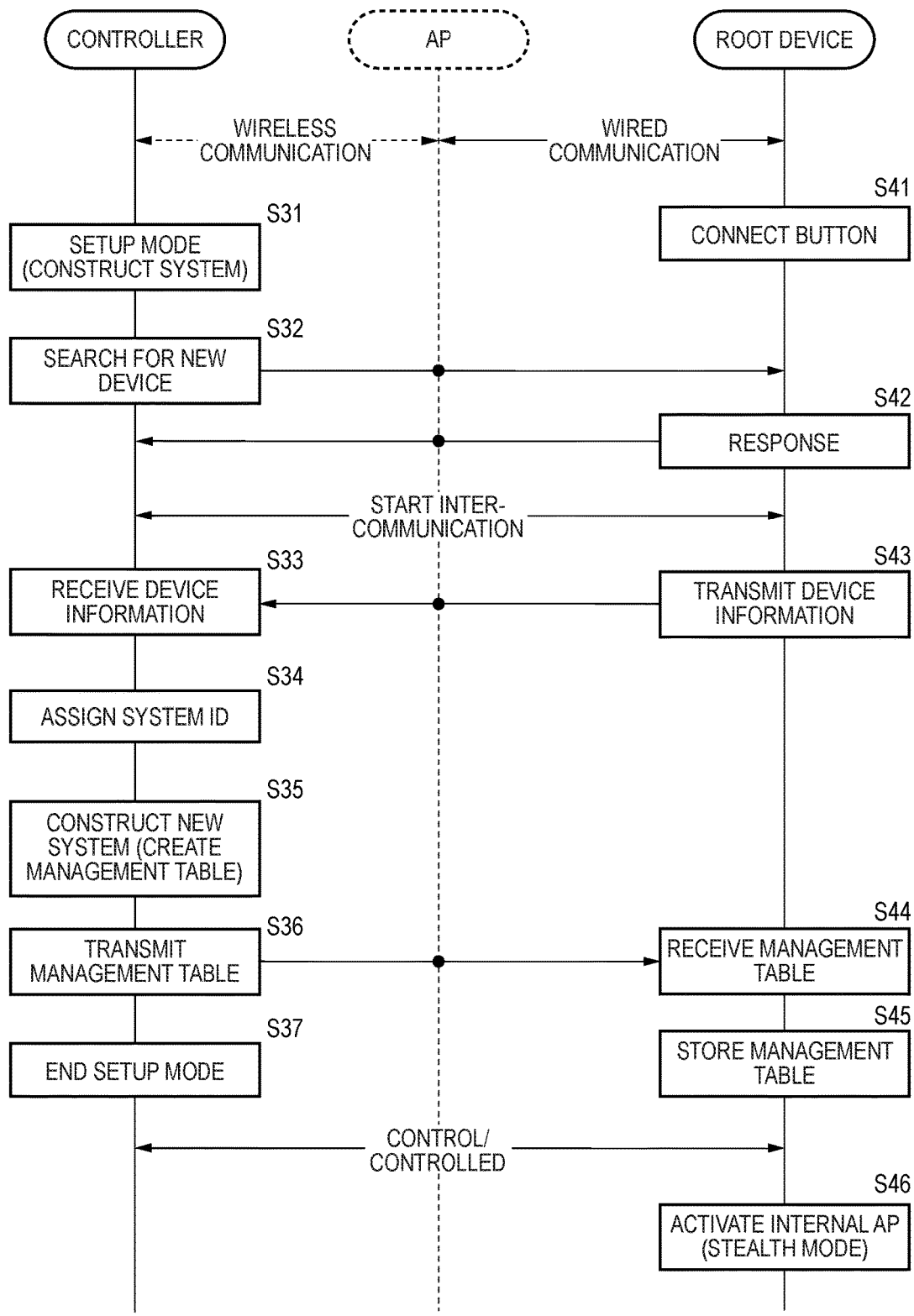
FIG. 6 is a view showing a procedure of communication between the controller and the audio device.

FIG. 6 is a view showing the procedure of communication between the controller 1 and the audio device 4-1 serving as the root device when the audio system 10 is newly constructed. The mobile phone 1 functions as the controller 1 as the audio system control program 70 is activated. When the controller 1 is set to the setup mode by an operation by the user (S31), a guidance screen to prompt for depression of the connect button 59A of the audio device 4 is displayed on the display portion 41. According to this guidance on the screen, the user depresses the connect button 59A of the audio device 4-1 (S41). Then, the controller 1 searches for a new audio device connected to the wired LAN 2 (S32). This search is performed by transmitting a message requiring a reply such as polling. The audio device 4-1 responds to this search (S42). Thereby, the controller 1 and the audio device 4-1 start intercommunication through the wired LAN 2 and the access point 3.

The audio device 4-1 transmits its own device information to the controller 1 (S43). The controller 1 constructs a new audio system 10 with this audio device 4-1 as the root device. A system ID is assigned to the audio system 10 (S34), the system management table and the audio control table shown in FIG. 4 and FIG. 5 are created, and the audio system 10 with the currently communicating audio device 4 as the root device is constructed (S35). When the audio system 10 is constructed, the system management table is transmitted to the audio device 4-1 that is made the root device (S36), and the setup mode is ended (S37). The audio device 4-1 receives this system management table (S44), and stores it (S45). Thereby, the audio system 10 is constructed in which the audio device 4-1 is the root device which is the core component. Thereafter, the reproduced music, the volume thereof and the like are controlled by the controller 1. The audio device 4 activates the access point in the stealth mode (S46).

Figure 7:
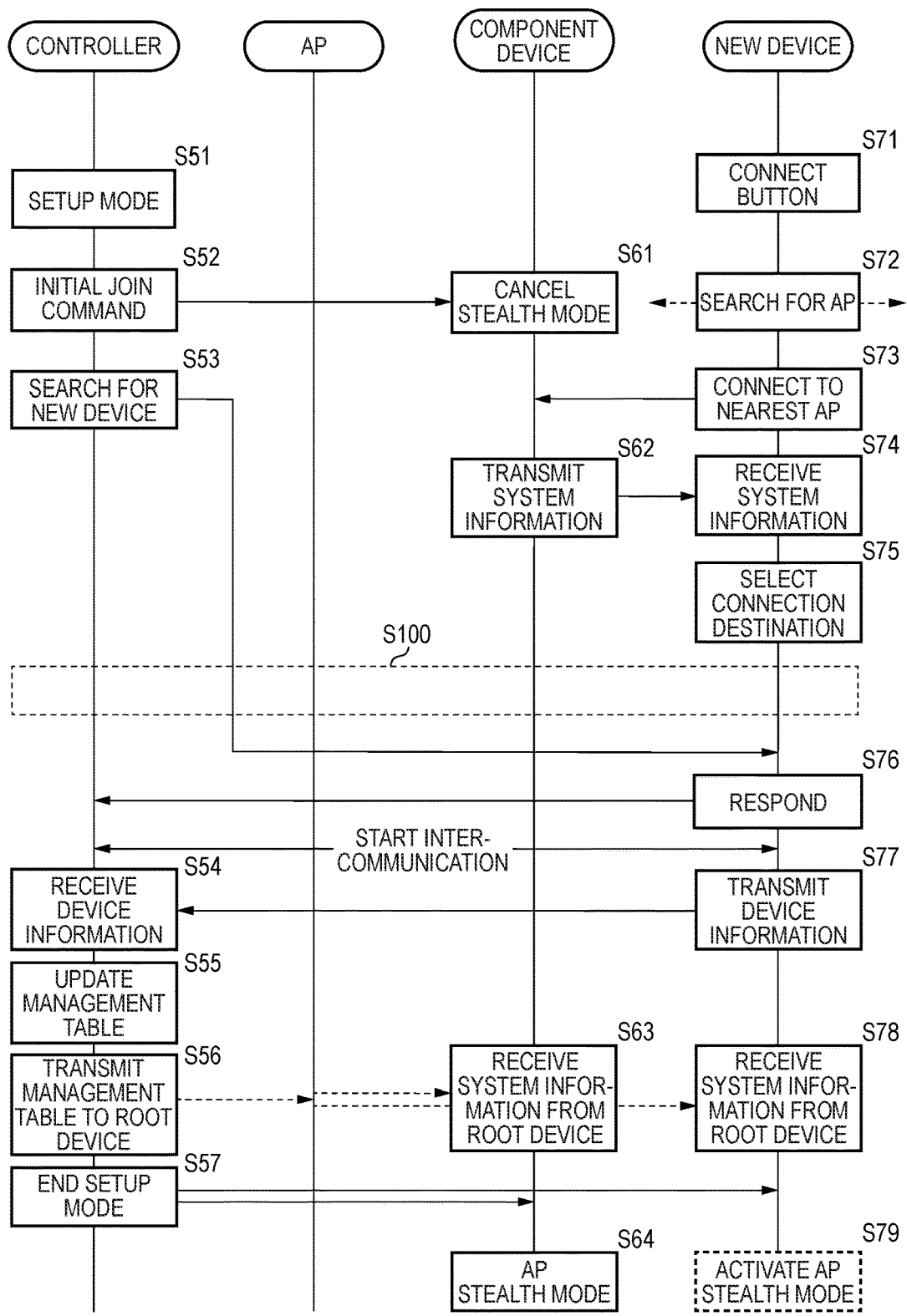
FIG. 7 is a view showing a procedure of communication between the controller and the audio device.

FIG. 7 is a view showing the procedure of communication when a new audio device is added to the audio system 10 having been constructed. The component device is the audio device 4 having already been a component of the audio system 10, and in this example, the root device or the node device where the internal access point 4A is activated. The new device is an audio device 4 to be newly added from now.

When the mobile phone 1 functioning as the controller 1 is set to the setup mode by an operation by the user (S51), the controller 1 transmits an initial join command to the component device which is the audio device 4 already registered in this audio system 10 (S52), and provides an instruction to cancel the stealth mode of the internal access point 4A. Thereby, the component device cancels the stealth mode of the internal access point 4A and transmits a beacon frame to notify its own presence to enable a passive scan of the new device (S61). Next, the controller 1 starts search for the new device (S53). This search is performed by broadcasting a new device search message to the entire network 9 beyond the bounds of the audio system 10.

Moreover, when the controller 1 is set to the setup mode, a guidance screen to prompt for depression of the connect button 59A of the audio device 4 (new device) is displayed on the display portion 41, and the user depresses the connect button 59A of the new device according to the guidance of this screen (S71). When the connect button 59A is depressed by the user (S71), an initial connection mode is set, and a connectable access point is searched for (passive scan) (S72). By this search, the new device detects the internal access points 4A of the component devices as connectable access points. As described above, the internal access point 4A has an SSID by which it can be identified that it is a device of the audio system 10 when viewed from the new device, and connection can be made by generating a password from the SSID (or the MAC address). The new device selects the nearest (the easiest-to-connect) one from among the detected internal access points 4A, and temporarily connects to the selected internal access point 4A by using this SSID and the generated password (S73). This connection is a temporary connection for obtaining system information and is not a regular connection for participating in the audio system 10. Then, the current system information of the audio system 10 is obtained from the connected internal access point 4A (component device) (S62, S74). The system information is information formed of all or some of the contents of the system management table, and is periodically updated by the root device 4-1 and delivered to other component devices. Based on the obtained system information, the new device selects an optimum access point in order to participate in the audio system 10 (S75). This selection is made based on the field intensity of each access point, the number of stages of connection from the root device 4-1, the number of component devices connected to the access point and the like, and an access point that is highly likely excellent in communication conditions is selected.

Figure 8:
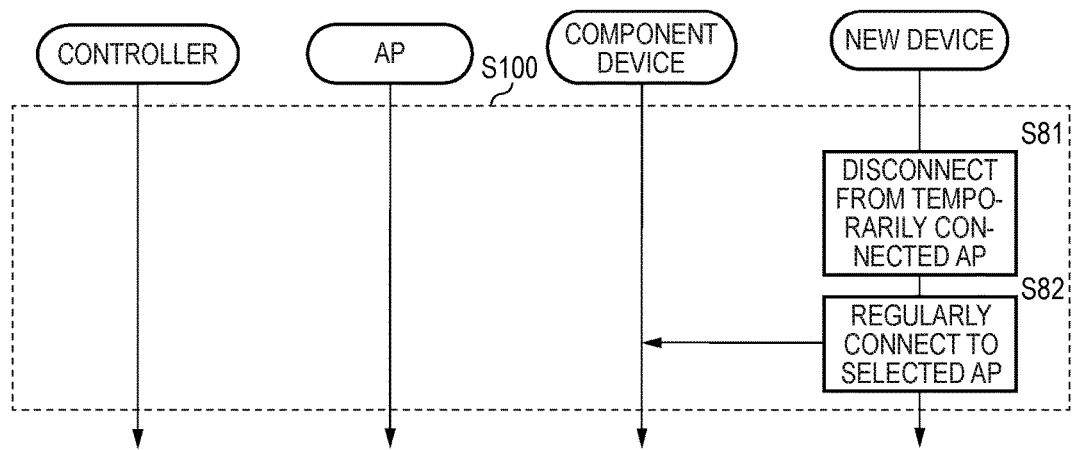
FIG. 8 is a view showing a procedure of communication between the controller and the audio device.
Figure 9:
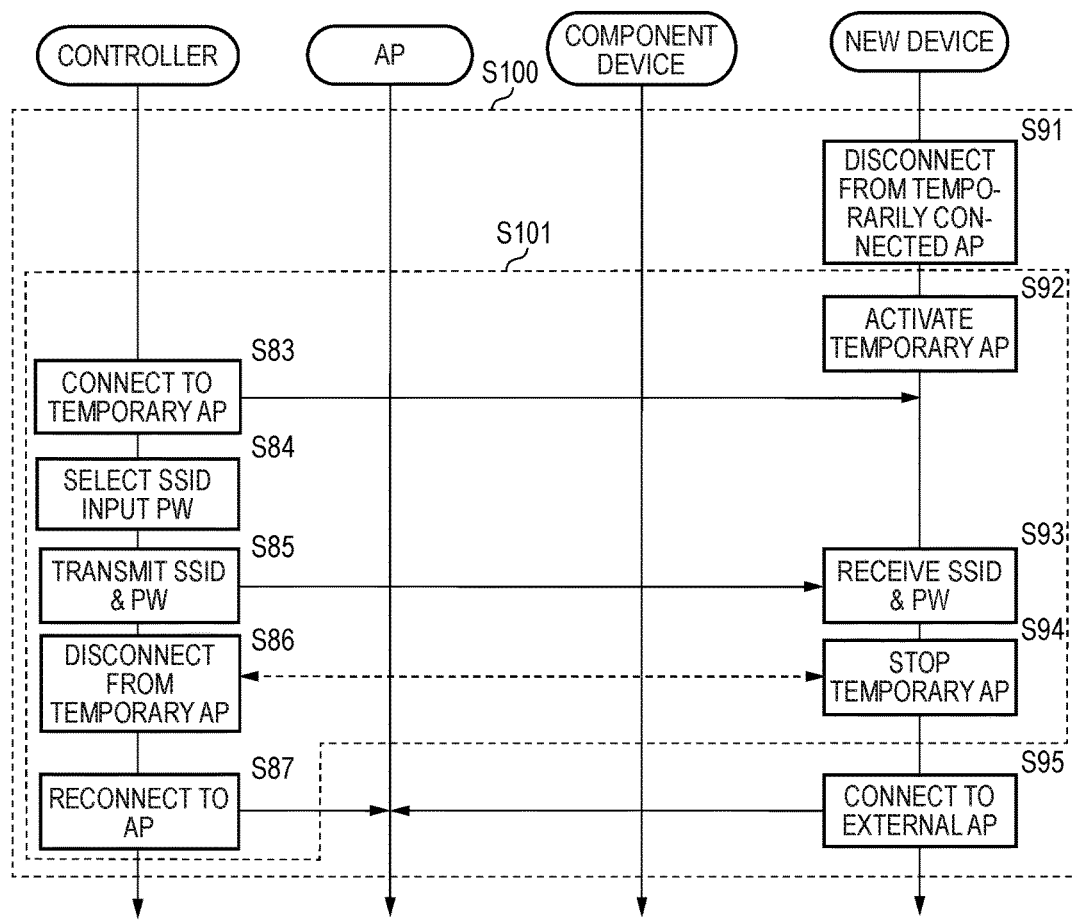
FIG. 9 is a view showing a procedure of communication between the controller and the audio device.

The example of FIG. 7 (example in which S100 is not executed) shows the flow in a case where determining that the temporarily connected internal access point 4A is optimum also in the regular connection, the destination of connection is not changed. For example, a case where connection is made to the internal access point 4A-1 of the root device 4-1 corresponds to this. When the destination of connection is changed from the temporarily connected internal access point 4A at the regular connection, the procedure of FIG. 8 or FIG. 9 is executed in the section of S100 shown in FIG. 7. When the regular connection is completed (in the case of FIG. 7, after temporary connection is made regular connection), the new device responds to the new device search message (S53) from the controller 1 (S76). This enables the new device to communicate with the controller 1. Thereby, the new device has its reproduced music, the volume thereof and the like controlled by the controller 1, and becomes a component of the audio system 10.

The new device transmits its own device information to the controller 1 (S77). The controller 1 receives this device information (S54), registers this new audio device 4 into the system management table and the audio control table to update them (S55). The controller 1 transmits the updated system management table to the root device 4-1 (S56). The root device 4-1 periodically delivers system information formed of all or some of the contents of the system management table to the other component devices as a connection confirmation message described with reference to FIG. 10. The system management table is transmitted to all the audio devices 4 of the audio system 10 (S56), and the setup mode is ended (S57). The notification of the end of the setup mode is transmitted to all the audio devices 4. The notification of the end of the setup mode may be provided to the root device 4-1 by the controller 1 so that the root device 4-1 transfers it to the other audio devices 4 of the audio system 10.

The new device having received the system information from the root device 4-1 stores this system information (S78). Thereafter, the new device activates the internal access point 4A in the stealth mode (S79). Moreover, the component device having received the system information from the root device 4-1 updates the internally stored system information with this information (S63). Then, the internal access point 4A is returned to the stealth mode (S64). By the above-described processing, a new device can be added to the audio system 10 having been constructed. In both the component devices and the new device, it is only in the root device and the node device that the internal access point 4A is activated in the stealth mode, and the processing of S64 and S79 is not performed in the leaf device and the branch device.

FIG. 8 is a view showing the communication procedure when the new device disconnects from the temporarily connected internal access point 4A at S75 and reconnects to another internal access point 4A in the tree. When another internal access point 4A is selected as the destination of the regular connection at S75 of FIG. 7, the new device disconnects from the currently temporarily connected internal access point 4A (S81), and regularly connects to the selected internal access point 4A (S82). Thereafter, the process proceeds to S76 of FIG. 7.

FIG. 9 is a view showing the communication procedure when the new device disconnects from the temporarily connected internal access point 4A at S75 and reconnects to the external access point 3 as the branch device. When the external access point 3 is selected as the destination of the regular connection at S75 of FIG. 7, the new device disconnects the currently temporarily connected internal access point 4A (S91), and activates on a stand-alone basis the temporary access point for only at the time of initial connection (S92). That is, the internal access point 4A that is not connected to the wired LAN 2 and is connected only to the new device is activated. The controller 1 previously stores the SSID and password of the temporary access point of this initial connection. That is, the SSID and the password are previously written as data in the audio system control program 70. Therefore, the controller 1 detects this temporary access point in the new device search started at S53, temporarily disconnects from the external access point 3, and connects to the temporary access point activated by the new device (S83). It is highly possible that the controller 1 cannot obtain the SSID and password of the external access point 3 from the system program of the mobile phone 1, in this example, the user is required to input the SSID and password of the external access point 3 (S84). The input of the SSID is performed by a method in which a list of connection destinations (SSID) that are seen at that time is displayed on a display and the user is made to select the SSID of the external access point 3. The password (normally shown on the main body of the external access point 3) is made to be input by the user.

Then, this inputted connection information is transmitted to the new device activating the temporary access point (S85). The new device receives this connection information (S93). After transmitting the connection information (the SSID, the password) of the external access point 3 to the new device, the controller 1 disconnects from the temporary access point (S86). When receiving the connection information of the external access point 3 from the controller 1, the new device stops the temporary access point (S94). The controller 1 reconnects to the temporarily disconnected external access point 3 (S87). The new device also connects to the external access point 3 by using the obtained connection information (S95). Returning to the procedure of FIG. 7 thereafter, the controller 1 performs new device search (S53), and the new device responds thereto (S76). When the connection information of the external access point 3 is contained in the system information obtained from the temporarily connected component, the processing shown at S101 (S83 to S87, S92 to 94) is omitted and reconnection to the external access point is made as in FIG. 8.

By the procedures of FIG. 6 to FIG. 9 being separately performed at the audio systems 10-1 and 10-2, the two audio systems 10-1 and 10-2 as shown in FIG. 1 are constructed.

As described above, the root device 4-n1 transmits the system information periodically (once every two seconds) to the other audio devices (component devices) 4-nm of the audio system 10-n. The system information is formed of the (internal access point side) MAC address, the IP address, the number of stages of connection from the root device 4-1 (hop count), the presence or absence of activation of the internal access point and the number of lower level devices connecting to the internal access point 4A of each component device, and the connection information of the external access point 3. The root device 4-n1 transmits this system information as an echo request packet (ping) to each component device 4-nm. Hereinafter, this packet will be referred to as system information packet.

Referring to FIG. 10, the periodically executed system information packet transmission processing will be described. In this description, the designation "-n, n" indicative of the number (location ID) of the audio system is omitted.

Figure 10A:
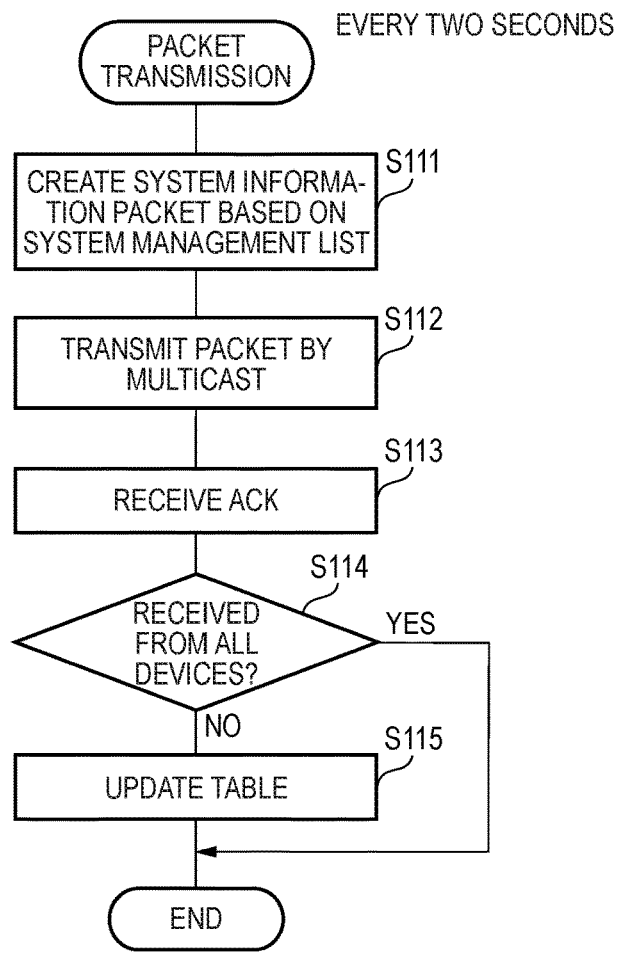
FIGS. 10A and 10B are flowcharts showing a system information transmission operation of the host device.
Figure 10B:
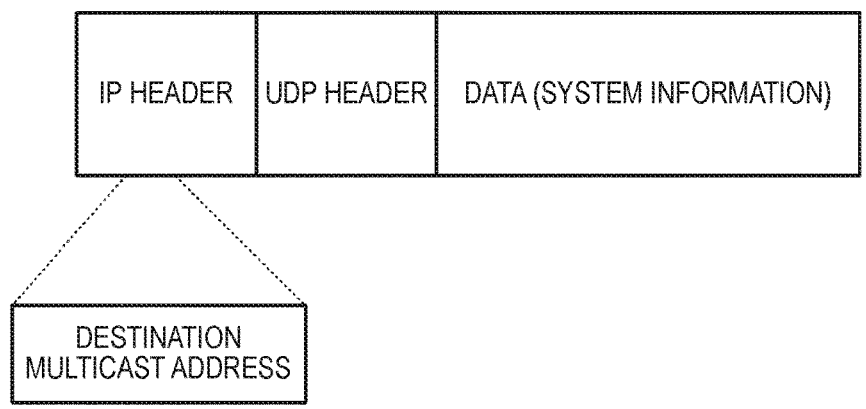

In FIG. 10A, the root device 4-1 creates the system information packet based on its own system management table (S111). The system information packet has a structure of an IP packet containing a UDP datagram with the system information shown in FIG. 10B as the data body, and the multicast address that is set for this audio system 10 is written as the destination address of the IP header. The root device 4-1 transmits the system information packet to the multicast address assigned to the audio system 10. Therefore, although the system information packet is delivered to all the component devices 4 of this audio system 10 (for example, 10-1), it is not delivered to the component devices 4 of the other audio systems 10 (for example, 10-2) (discarded).

When receiving the system information packet, the component devices 4 each update the system information owned by itself with the system information contained in this packet, and returns to the root device 4-1 an acknowledgement packet (ACK) to the effect that the system information packet has been received. The root device 4-1 receives the acknowledgement packet from the component device (S113), and determines whether a reply has been returned from all the component devices (S114). When a reply has been returned from all the component devices (YES at S114), the process ends without doing anything. When there is a component device from which no reply has been returned (NO at S114), the component device is rewritten to be non-active to update the system management table (S115). The creation of the next system information packet is performed with the contents of this updated system management table. For this reason, the component devices are capable of always obtaining the latest system information. The contents of the updated management table are also notified to the controller 1. While the system information is transmitted by multicast in the description of FIG. 10, it may be individually transmitted to each component device by unicast.

Scenes where the component device cannot return the ACK to the root device 4-1 include a case where the own device is responsible such as when the own device is powered off (unplugged) and a case where a higher level device is responsible such as when the higher level device of the tree is powered off (unplugged) or when the radio wave condition of the communication is poor. When communication with the higher level component device (the internal access point 4A) is disconnected from the higher level component device, component devices (particularly, the node device and the leaf device) search for another connectable access point and automatically try reconnection. The disconnection of communication with the higher level internal access point 4A can be determined, for example, by that the above-described system information packet is not transmitted, that the notification of update of an encryption key is not transmitted or that there is no reply to a keep-alive packet.

Now, a case will be described where an audio device 4 (for example, 4-13) registered in an audio system 10 (for example, 10-1) is shifted to another audio system 10 (for example, 10-2).

As described with reference to FIG. 7, when receiving the new device search message in a state of being connected to the network 9 (S75 and succeeding steps), the audio device 4 responds thereto (S76), and the process is proceeded with so that the audio device 4 belongs to the audio system where the message is transmitted (S54, S78 and succeeding steps). When the procedure of FIG. 7 is executed in a case where an audio device 4 already registered in an audio system 10 is shifted to another audio system 10, the audio device 4 comes to belong to another audio system 10 while being connected to the former tree.

As an example, when the audio device 4-13 shown in FIG. 1 is shifted from the audio system 10-1 to the audio system 10-2, the controller 1-2 is set to the setup mode by the user, and the connect button 59A of the audio device 4-13 is depressed. When the procedure of FIG. 7 is executed in this case, since the audio device 4-13 has already been connected to the network 9 through the audio device 4-11 which is the root device of the audio system 10-1, it can respond under the status quo to the new device search message broadcast from the controller 1-2, so that the system to which the audio device 4-13 belongs is changed to the audio system 10-2 while being connected to the tree (the root device 4-11) of the audio system 10-1. When the connection configuration becomes like this, efficient audio signal transmission in each audio system 10 (particularly, the audio system 10-1) can be obstructed.

Therefore, even in a case where the audio device 4 where the connect button 59A is depressed is already connected to the network 9 through the internal access point 4A, when the audio device 4 does not receive the initial join command, that is, when it cannot confirm that the controller 1 of the audio system 10 to which it belongs is in the setup mode, it does not respond to the new device search message transmitted by broadcast, and after performing reconnection to the network, responds to this message. Thereby, when the audio system 10 to which the audio device 4 belongs is changed, the network connection configuration is simultaneously changed to an appropriate one. Hereinafter, the procedure will be described.

Figure 11:
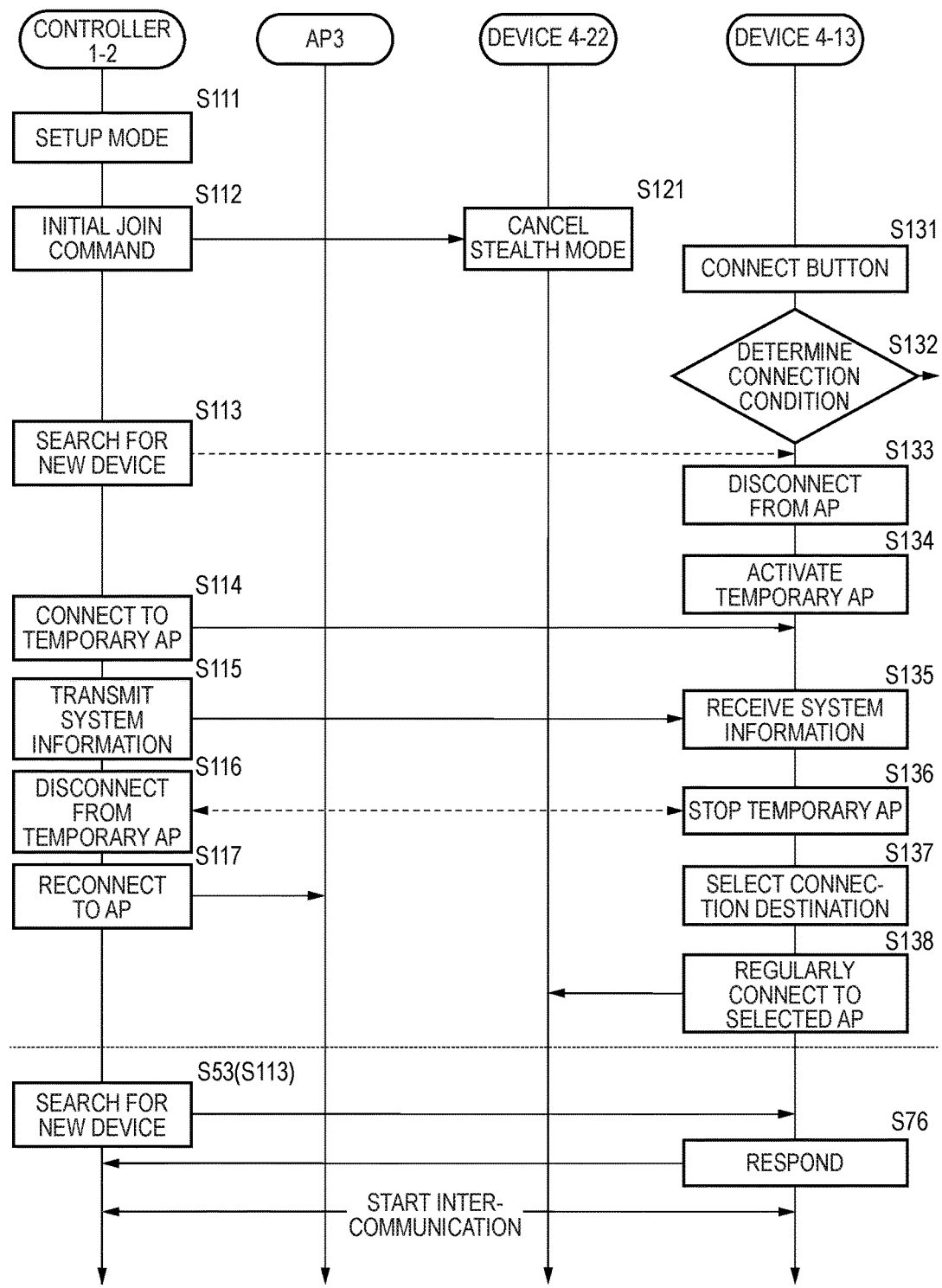
FIG. 11 is a view showing a communication procedure when the audio device is reconnected.
Figure 12:
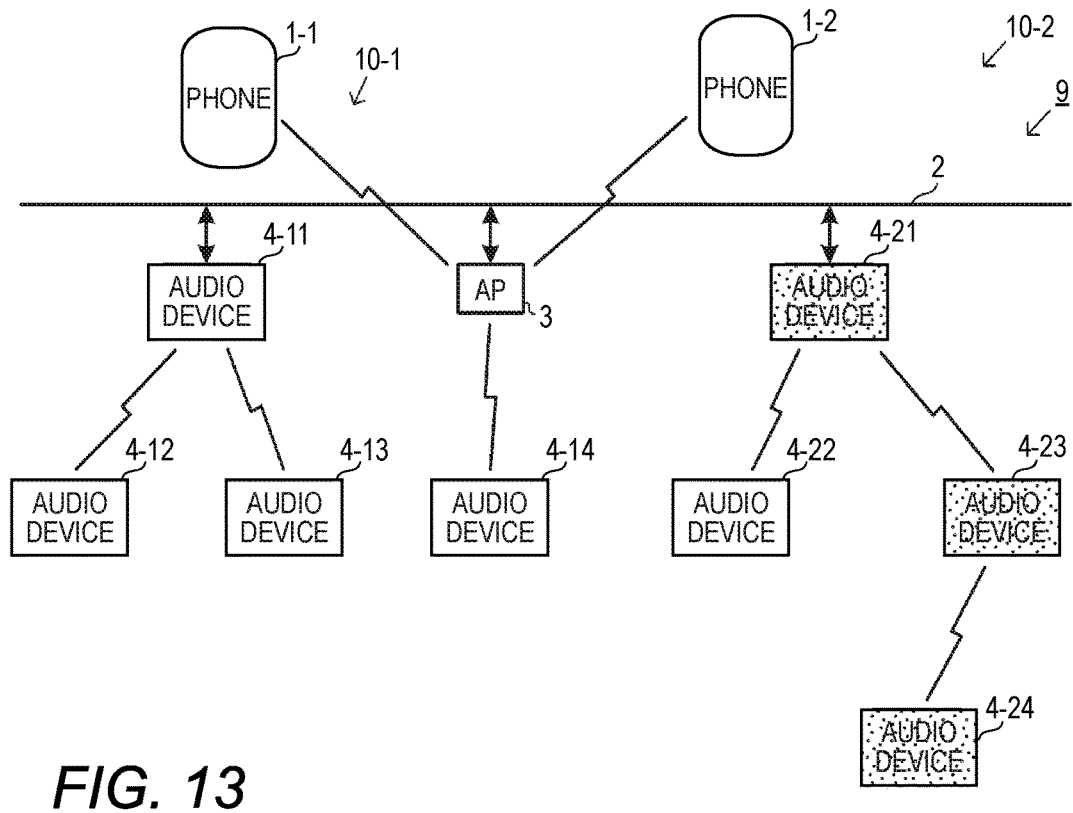
FIG. 12 is a view explaining a mode of changing the connection destination at the time of a system shift of the audio device.
Figure 13:
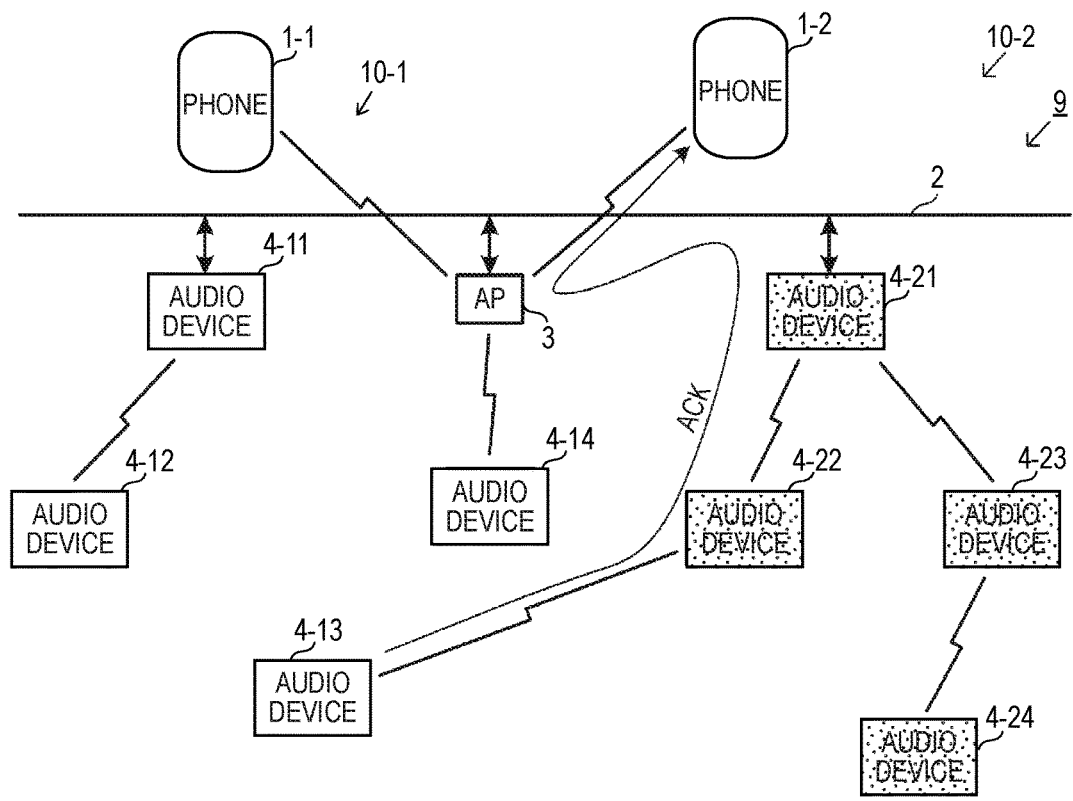
FIG. 13 is a view explaining the mode of changing the connection destination at the time of the system shift of the audio device.

FIG. 11 is a view showing the communication procedure when an audio device 4 (for example, 4-13) registered in an audio system 10 (for example, 10-1)) is shifted to another audio system 10 (for example, 10-2). In this example, description will be given by using as an example a case where the audio device 4-13 is shifted from the audio system 10-1 to the audio system 10-2. FIG. 12 and FIG. 13 are views showing a change of the connection configuration when the audio system to which the audio device 4-13 belongs is shifted from the audio system 10-1 to the audio system 10-2.

In FIG. 11, in order to add the audio device 4-13 to the audio system 10-2, the controller 1-2 is set to the setup mode by an operation by the user (S111). Then, the controller 1-2 transmits the initial join command to the audio devices (component devices) 4-21 to 24 already registered in the audio system 10-2 (S112) to provide an instruction to cancel the stealth mode of the internal access point 4A (S121). Then, the controller 1-2 starts search for the new device (S113). This search is performed by broadcasting a new device search message to the entire network 9 beyond the bounds of the audio system 10-2.

Moreover, when the controller 1-2 is set to the setup mode, a guidance screen to prompt for depression of the connect button 59A of the audio device 4 to be added is displayed on the display portion 41 as described above, and the user depresses the connect button 59A of the audio device 4-13 according to the guidance of this screen (S131). When the connect button 59A is depressed by the user (S131), the audio device 4-13 is set to the initial connection mode, and determines the condition of its own connection to the network 9 (S132). When the audio device 4-13 is not connected to the network 9, the process proceeds to the procedure of S72 and succeeding steps of FIG. 7. When the audio device 4-13 is connected to the external access point 3 wirelessly or when it is connected to the network 9 by cable, determining that the connection is valid, the process proceeds to S76 and succeeding steps of FIG. 7. When the audio device 4-13 is connected to the internal access point 4A of another audio device 4 and receives the initial join command, determining as reconnection in the audio system 10 to which it currently belongs, the process proceeds to the procedure of S72 and succeeding steps of FIG. 7 (assuming that the result of the determination at S132 in any of the above is the rightward arrow, the description of the following procedure is omitted). On the other hand, when the audio device 4-13 is connected to the internal access point 4A of another audio device 4 but does not receive the initial join command, that is, when the connect button 59A of the audio device 4-13 is depressed as shown in FIG. 12, since the initial join command issued by the controller 1-2 is delivered to the audio system 10-2 and is not transmitted to the audio device 4-13, the audio device 4-13 does not belong to the audio system 10-2, and determining as a shift to the tree of the audio system 10-2, the procedure of FIG. 11 is executed.

The audio device 4-13 disconnects from the currently connected internal access point 4A (S133), and activates on a stand-alone basis a temporary access point for only at the time of initial connection (S134). The controller 1-2 previously stores the SSID and password of the temporary access point of this initial connection. That is, these SSID and password are previously written as data in the audio system control program 70. Therefore, the controller 1-2 detects this temporary access point in the new device search started at S113, temporarily cancels the connection with the external access point 3, and connects to the temporary access point activated by the new device (S114).

Then, the controller 1-2 transmits the system information of the audio system 10-2 to the audio device 4-13 (S115), and the audio device 4-13 receives the system information (S135). After transmitting the system information to the audio device 4-13, the controller 1-2 cancels the connection with the temporary access point (S116). In parallel, the audio device 4-13 stops the temporary access point (S136). The controller 1-2 again connects to the external access point 3 the connection with which is temporarily canceled (S117). The audio device 4-13, the new device, selects an optimum access point in order to shift to the audio system 10-2 based on the obtained system information (S137). This selection is made based on the field intensity of each access point, the number of stages of connection from the root device 4-1, the number of component devices connected to the access point and the like, and an access point that is highly likely excellent in communication conditions is selected from among access points including the external access point 3 and the internal access point 4A. The audio device 4-13 connects to the selected access point (S138). At this time, the audio device 4-13 is connected to the internal access point 4A-22 of the audio device 4-22, for example, as shown in FIG. 13. Thereafter, the audio device 4-13 responds (S76) to the new device search message (S113, S53) of the controller 1-2 over the path over which it is connected, and the process shifts to the procedure of FIG. 7.

By the above-described procedure, after connection is changed from the tree of the audio system 10-1 to the tree of the audio system 10-2, the audio device 4-13 responds to the controller 1-2, and registration in the audio system 10-2 is performed. In the audio system 10-1, the tables of FIGS. 4 and 5 are updated by the ceasing of the response from the audio device 4-13 at S114 of FIG. 10.

In the above, regarding when the connect button 59A of the audio device 4 is depressed, the following cases are described with reference to FIG. 6, FIG. 7 and FIG. 11: a case where the audio system 10 is newly constructed (a case where the audio device 4 is made the root device); a case where the audio device 4 is added to the audio system 10; and a case where the audio system 10 to which the audio device 4 belongs is changed. While the operation of the audio device 4 is described on the assumption that the operation after the depression of the connect button 59A is determined in FIG. 6, FIG. 7 and FIG. 11, in actuality, the audio device 4 switches the operation (to FIG. 6, FIG. 7 or FIG. 11) according to the condition of connection to the network 9 since it is unknown what the registration destination audio system 10 is like when the connect button 59A is depressed. The operation of the audio device 4 when the connect button 59A is depressed will be described with reference to FIG. 14.

Figure 14:
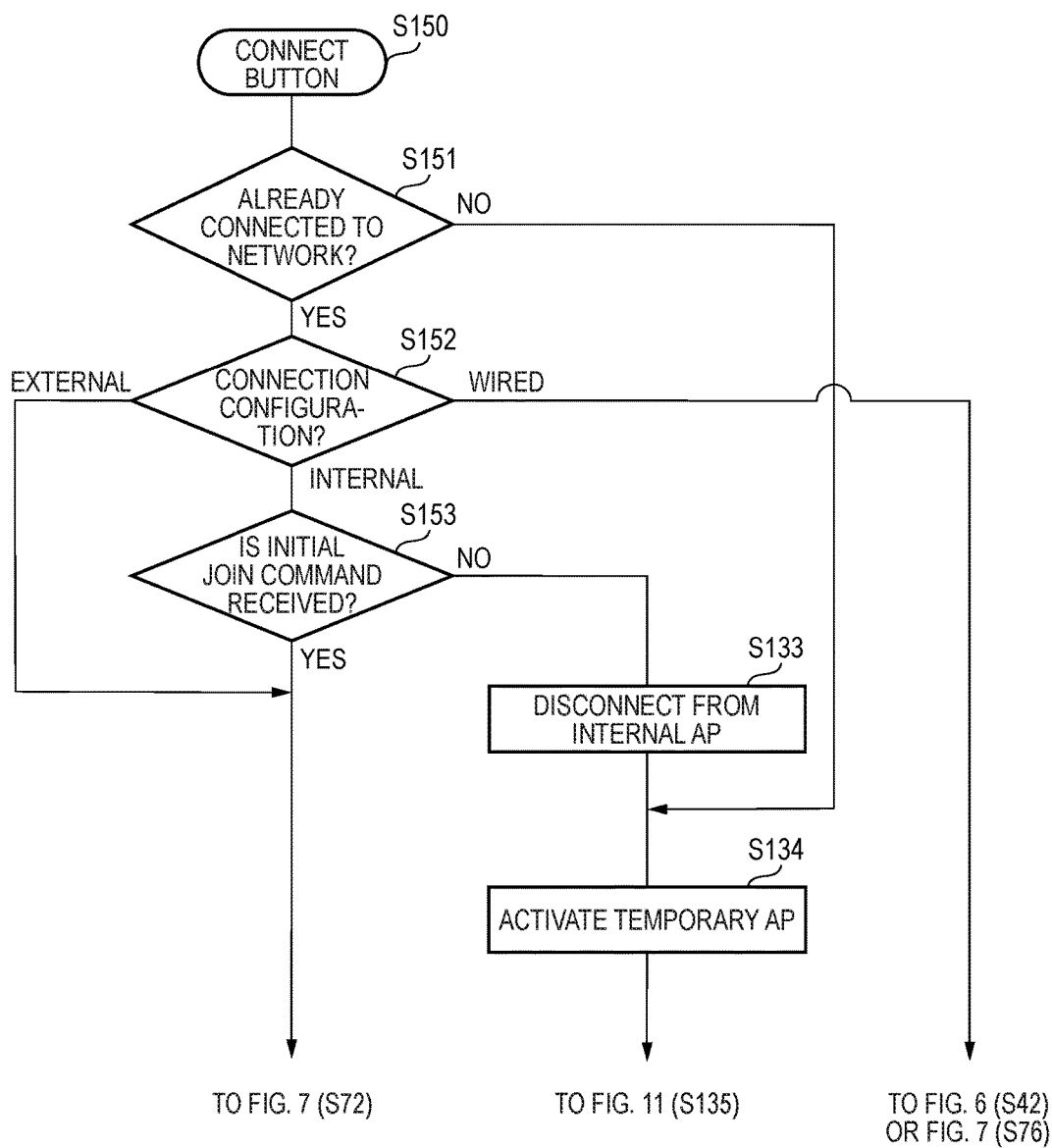
FIG. 14 is a flowchart showing the operation when a connect button of a control portion of the audio device is depressed.

In FIG. 14, when the connect button 59A is depressed (S150), the control portion 50 of the audio device 4 determines whether the own device is connected to the network 9 (S151). When it is connected to the network 9 (YES at S151), the configuration of connection to the network 9 is determined (S152). When it is connected to the network 9 (the wired LAN 2) through the external access point 3, the process proceeds to S72 of FIG. 7. When it is directly connected to the wired LAN 2 (by cable), the process proceeds to S42 of FIG. 6 (when the audio system 10 is constructed) or S76 of FIG. 7 (when the device is added to the audio system 10).

When the own device is connected to the network 9 through the internal access point 4A, that is, when it is connected to the tree of the audio system 10, the control portion 50 determines whether the initial join command is received from the controller 1 of the audio system 10 or not (S153). When the initial join command is received (YES at S153), it is determined that reconnection in the same audio system 10 is to be performed, and the process proceeds to S72 of FIG. 7 (AP search). On the other hand, when the initial join command is not received (NO at S153), it is determined that the processing of shifting from the audio system 10 to which it currently belongs to another audio system 10 is to be performed, the currently connected internal access point 4A is disconnected (S133), a temporary access point is activated by the wireless LAN communication portion 57 (S134), and the process proceeds to S135 of FIG. 11 (activate temporary AP). Moreover, when it is determined that the audio device 4 is not connected to the network 9 at S151 (No at S151), the temporary access point is activated by the wireless LAN communication portion 57 in order to communicate with the controller 1 that is set in the setup mode (S134), and the process proceeds to S135.

The audio devices of this disclosure may be audio/video (AV) devices having a video reproduction function, and include a system where these coexist. Moreover, while in this embodiment, the control terminal device is implemented as the mobile phone 1 where the audio system control program 70 (application program) is installed, a different structure may be adopted. For example, it may be a tablet terminal where the audio system control program 70 is installed, or may be a dedicated terminal device.

Now, the embodiment of the present disclosure is summarized as follows:

(1) A communication system of the present disclosure is a communication system including: a control terminal device configured to be connected by a network; and one or more communication devices, wherein the one or more communication devices is connected to a predetermined connection position of the network; wherein the control terminal device includes: a communication portion configured to communicate with the one or more communication devices through the network or by direct connection; and a storage portion configured to store a system management table for managing the one or more communication devices of the communication system; wherein the control terminal device configured to transmit a search message to the entire network when the communication device is registered into the communication system; wherein the communication device includes a communication portion configured to communicate with the one or more control terminal devices through the network or by direct connection; wherein when the communication device is connected to the network, the communication device is configured to determine whether a connection position of the connected communication device on the network is the predetermined connection position; wherein when the communication device is connected to the predetermined connection position, the communication device configured to respond to the search message through the network; and wherein when the communication device is connected to the network but is not connected to the predetermined connection position, the communication device is configured to cancel the connection with the network, and after directly connecting to the control terminal device and obtaining information for connecting to the predetermined connection position of the network, the communication device is configured to connect to the predetermined connection position of the network and to respond to the search message through the network.

(2) In the communication system according to the above (1), for example, when receiving a response to the search message from the communication device, the control terminal device is configured to register the communication device into the system management table.

(3) In the communication system according to the above (1) or (2), for example, the communication device includes an operation portion is configured to accept an operation of registration into the communication system, and to check whether or not the communication portion of the communication device is connected to the network when the operation portion of the communication device accepts the operation of registration.

(4) In the communication system of the present disclosure, in the communication system according to the above (3), for example, when the communication portion of the communication device is not connected to the network, after the communication device directly connects to the control terminal device and obtains information for the communication device to connect to the predetermined connection position of the network, the communication device is configured to connect to the predetermined connection position of the network and to respond to the search message through the network.

(5) In the communication system according to any of the above (1) to (4), for example, the control terminal device is configured to transmit a network connection preparation command to the one or more communication devices in the communication system while transmitting the search message to the entire network; and the communication device is configured to determine whether the communication device itself is connected to the predetermined connection position of the network or not based on whether the network connection preparation command is received or not.

(6) In the communication system according to any of the above (1) to (5), for example, the communication device includes a first wireless communication portion configured to function as a wireless relay device and a second wireless communication portion configured to function as a child device connected to another device; and the communication device is configured to be connected to the predetermined connection position of the network by the second wireless communication portion of the communication device being connected to the first communication portion of a higher level communication device.

(7) In the communication system according to any of the above (1) to (6), for example, the predetermined connection position of the network is a predetermined communication device in a connection configuration where the more than one communication device is connected as a node or a root on the network.

(8) A communication system in which a first system and a second system which are unit communication systems each having the structure according to any one of the above (1) to (6) are formed on the same network is a communication system, wherein when the control terminal device of the second system transmits the search message and the communication device of the first system accepts the operation of registration, the communication device of the first system is configured to cancel the network connection of the predetermined connection position of the first system, to directly connect to the control terminal device of the second system, to obtain information for connecting to the predetermined connection position of the second system, and to connect to the predetermined connection position of the second system.

(9) A communication system of the present disclosure is a communication system including: a plurality of unit communication systems each having a control terminal device and one or more communication devices which are connected by a network, wherein the control terminal device includes a communication portion configured to communicate with the one or more communication devices through the network or by direct connection; wherein the control terminal device is configured to transmit a network connection preparation command to the communication device in the unit communication system to which the control terminal device belongs when a communication device is added to the unit communication system to which the control terminal device belongs; wherein the communication device includes: a communication portion configured to communicate with the control terminal device through the network or by direct connection; and an operation portion configured to accept an operation of connection to the communication system; and wherein when the operation portion accepts the operation of connection, the communication device is configured to directly connect to the control terminal device that transmits the network connection preparation command and to obtain information for connecting to the network of the unit communication system in a case that the communication portion of the communication device is not connected to the network or in a case that the network connection preparation command is not received although the communication portion of the communication device is connected to the network.

(10) In the communication system according to any of the above (1) to (9), for example, the communication device is an audio device.

(11) A communication device management method of the present disclosure is a communication device management method of a communication system including: a control terminal device configured to be connected by a network and one or more communication devices and wherein the one or more communication devices is connected to a predetermined connection position of the network, wherein the control terminal device transmits a search message to the entire network; wherein the communication device determines whether the communication device itself is connected to the network; wherein when the communication device is connected to the network, the communication device determines whether a network connection position of the communication device is the predetermined connection position; wherein when the communication device is connected to the predetermined connection position, the communication device responds to the search message through the network; wherein when the communication device is not connected to the predetermined connection position, the communication device cancels the network connection, directly connects to the control terminal device without through the network, and obtains information for connecting to the predetermined connection portion of the network; wherein the communication device having obtained the information for connecting to the predetermined connection position of the network connects to the predetermined connection position of the network, and responds to the search message through the network; and wherein the control terminal device receives the response to the search message, and registers the communication device into the communication system.

(12) In the communication device management method according to the above (11), for example, when the communication device is not connected to the network, the communication device directly connects to the control terminal device without through the network, and obtains information for connecting to the predetermined connection position of the network from the control terminal device.

(13) In the communication device management method according to the above (11) or (12), for example, the control terminal device transmits a network connection preparation command to the one or more communication devices in the communication system while transmitting the search message to the entire network; and the communication device determines whether the communication device itself is connected to the predetermined connection position of the network or not based on whether the network connection preparation command is received or not.

(14) In the communication device management method according to any of the above (11) to (13), for example, the communication device is an audio device.

(15) A communication device of the present disclosure is a communication device including: a communication portion configured to communicate with a control terminal device for managing the control terminal device through a network or by direct connection; and a control portion, wherein when the communication portion is connected to the network, the control portion is configured to determine whether the connection position of the communication device on the network is the predetermined connection position; wherein when the communication device is connected to the predetermined connection position, the communication portion is configured to respond to a search message through the network; and wherein when the communication device is not connected to the predetermined connection position although the communication portion is connected to the network, the communication portion is configured to cancel the connection with the network, to obtain information for connecting to the predetermined connection position of the network by directly connecting to the control terminal device, and then to respond to the search message through the network by connecting the predetermined connection position of the network.

(16) In the communication device according to the above (15), for example, when the communication portion is not connected to the network, after connection is directly made to the control terminal device and the information for connecting to the predetermined connection position of the network is obtained, connection is made to the predetermined connection position of the network and a response to the search message is made through the network.

(17) In the communication device according to the above (15) or (16), for example, the control portion is configured to determine whether the communication device itself is connected to the predetermined connection position of the network or not based on whether a network connection preparation command transmitted from the control terminal device is received or not.

(18) In the communication device according to any of the above (15) to (17), for example, the communication portion includes a first wireless communication portion that functions as a wireless relay device and a second wireless communication portion that functions as a child device connected to another device; and connection of the communication device is made to the predetermined connection position of the network by the second wireless communication portion thereof being connected to a first communication portion of another communication device of a higher level.

(19) In the communication device according to any of the above (15) to (18), for example, the communication device the communication device further includes an audio signal processing portion configured to process an audio signal.

According to the present disclosure, when an audio device registered in a first audio system is shifted to a second audio system, for example, it is possible to change the tree-form connection configuration of the network and shift the registration to an appropriate audio system, which is useful.

What is claimed is:

1. A communication system comprising:
    a control terminal device configured to be connected by a network; and
    one or more communication devices, wherein:
    the one or more communication devices is connected to a predetermined connection position of the network,
    the control terminal device comprises:
        a communication circuit configured to communicate with the one or more communication devices through the network or by direct connection, and
        a storage configured to store a system management table for managing the one or more communication devices of the communication system,
    the control terminal device is configured to transmit a search message to the entire network when the communication device is registered into the communication system,
    the communication device comprises a communication circuit configured to communicate with the one or more control terminal devices through the network or by direct connection,
    when the communication device is connected to the network, the communication device is configured to determine whether a connection position of the connected communication device on the network is the predetermined connection position,
    when the communication device is connected to the predetermined connection position, the communication device is configured to respond to the search message through the network, and
    when the communication device is connected to the network but is not connected to the predetermined connection position, the communication device is configured to cancel the connection with the network, and after directly connecting to the control terminal device and obtaining information for connecting to the predetermined connection position of the network, the communication device is configured to connect to the predetermined connection position of the network and to respond to the search message through the network.

2. The communication system according to claim 1, wherein:
when receiving a response to the search message from the communication device, the control terminal device is configured to register the communication device into the system management table.

3. The communication system according to claim 1, wherein:
the communication device comprises an operation portion is configured to accept an operation of registration into the communication system, and to check whether or not the communication circuit of the communication device is connected to the network when the operation portion of the communication device accepts the operation of registration.

4. The communication system according to claim 3, wherein:
when the communication circuit of the communication device is not connected to the network, after the communication device directly connects to the control terminal device and obtains information for the communication device to connect to the predetermined connection position of the network, the communication device is configured to connect to the predetermined connection position of the network and to respond to the search message through the network.

5. The communication system according to claim 1, wherein:
the control terminal device is configured to transmit a network connection preparation command to the one or more communication devices in the communication system while transmitting the search message to the entire network, and
the communication device is configured to determine whether the communication device itself is connected to the predetermined connection position of the network or not based on whether the network connection preparation command is received or not.

6. The communication system according to claim 1, wherein:
the communication device comprises a first wireless communication circuit configured to function as a wireless relay device and a second wireless communication circuit configured to function as a child device connected to another device, and
the communication device is configured to be connected to the predetermined connection position of the network by the second wireless communication circuit of the communication device being connected to the first communication circuit of a higher level communication device.

7. The communication system according to claim 1, wherein:
the predetermined connection position of the network is a predetermined communication device in a connection configuration where the more than one communication device is connected as a node or a root on the network.

8. A communication system in which a first system and a second system which are unit communication systems each having the structure according to claim 1 are formed on the same network, wherein:
when the control terminal device of the second system transmits the search message and the communication device of the first system accepts the operation of registration, the communication device of the first system is configured to cancel the network connection of the predetermined connection position of the first system, to directly connect to the control terminal device of the second system, to obtain information for connecting to the predetermined connection position of the second system, and to connect to the predetermined connection position of the second system.

9. The communication system according to claim 1, wherein:
the communication device is an audio device.

10. A communication device management method of a communication system comprising a control terminal device configured to be connected by a network and one or more communication devices and wherein the one or more communication devices is connected to a predetermined connection position of the network, wherein:
the control terminal device transmits a search message to the entire network,
the communication device determines whether the communication device itself is connected to the network,
when the communication device is connected to the network, the communication device determines whether a network connection position of the communication device is the predetermined connection position,
when the communication device is connected to the predetermined connection position, the communication device responds to the search message through the network,
when the communication device is not connected to the predetermined connection position, the communication device cancels the network connection, directly connects to the control terminal device without through the network, and obtains information for connecting to the predetermined connection portion of the network,
the communication device having obtained the information for connecting to the predetermined connection position of the network connects to the predetermined connection position of the network, and responds to the search message through the network, and
the control terminal device receives the response to the search message, and registers the communication device into the communication system.

11. The communication device management method according to claim 10, wherein:
when the communication device is not connected to the network, the communication device directly connects to the control terminal device without through the network, and obtains information for connecting to the predetermined connection position of the network from the control terminal device.

12. The communication device management method according to claim 10, wherein:
the control terminal device transmits a network connection preparation command to the one or more communication devices in the communication system while transmitting the search message to the entire network, and the communication device determines whether the communication device itself is connected to the predetermined connection position of the network or not based on whether the network connection preparation command is received or not.

13. The communication device management method according to claim 10, wherein:
the communication device is an audio device.

14. A communication device comprising:
a communication circuit configured to communicate with a control terminal device for managing the control terminal device through a network or by direct connection;
a processor; and
a memory having stored thereon instructions executable by the processor to cause the communication device to perform:
when the communication circuit is connected to the network, determining whether the connection position of the communication device on the network is the predetermined connection position;
when the communication device is connected to the predetermined connection position, responding to a search message through the network by the communication circuit, and
when the communication device is not connected to the predetermined connection position although the communication circuit is connected to the network, cancelling the connection with the network by the communication circuit, obtaining information for connecting to the predetermined connection position of the network by directly connecting to the control terminal device, and then responding to the search message through the network by connecting the predetermined connection position of the network.

15. The communication device according to claim 14, wherein:
when the communication circuit is not connected to the network, after connection is directly made to the control terminal device and the information for connecting to the predetermined connection position of the network is obtained, connection is made to the predetermined connection position of the network and a response to the search message is made through the network.

16. The communication device according to claim 14, wherein:
the instructions cause the communication device to perform determining whether the communication device itself is connected to the predetermined connection position of the network or not based on whether a network connection preparation command transmitted from the control terminal device is received or not.

17. The communication device according to claim 14, wherein:
the communication circuit comprises a first wireless communication circuit that functions as a wireless relay device and a second wireless communication circuit that functions as a child device connected to another device, and
connection of the communication device is made to the predetermined connection position of the network by the second wireless communication circuit thereof being connected to a first communication circuit of another communication device of a higher level.

18. The communication device according to claim 14, wherein:
the communication device further comprises an audio signal processor configured to process an audio signal.

* * * * *